United States Patent
Rick et al.

(10) Patent No.: US 8,693,525 B2
(45) Date of Patent: *Apr. 8, 2014

(54) MULTI-CARRIER TRANSMITTER FOR WIRELESS COMMUNICATION

(75) Inventors: Roland Reinhard Rick, Superior, CO (US); Kai Tang, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 937 days.

This patent is subject to a terminal disclaimer.

(21) Appl. No.: 11/777,250

(22) Filed: Jul. 12, 2007

(65) Prior Publication Data

US 2008/0013639 A1  Jan. 17, 2008

Related U.S. Application Data

(60) Provisional application No. 60/831,044, filed on Jul. 14, 2006.

(51) Int. Cl.
    *H04B 1/00* (2006.01)
(52) U.S. Cl.
    USPC .......................... 375/146; 375/260; 375/259
(58) Field of Classification Search
    USPC ............ 375/260, 259, 146; 455/59; 370/69.1; 714/786, 794, 795
    See application file for complete search history.

(56) References Cited

U.S. PATENT DOCUMENTS

| | | | |
|---|---|---|---|
| 5,852,630 A * | 12/1998 | Langberg et al. | 375/219 |
| 6,215,430 B1 * | 4/2001 | Smith et al. | 341/144 |
| 6,504,831 B1 * | 1/2003 | Greenwood et al. | 370/342 |
| 6,580,702 B1 * | 6/2003 | Lee | 370/335 |
| 6,901,058 B2 | 5/2005 | Lalwaney | |
| 7,162,218 B2 | 1/2007 | Axness et al. | |
| 7,453,945 B2 | 11/2008 | Boettcher et al. | |

(Continued)

FOREIGN PATENT DOCUMENTS

| | | |
|---|---|---|
| CN | 1303193 A | 7/2001 |
| EP | 0869647 | 10/1998 |

(Continued)

OTHER PUBLICATIONS

International Preliminary Report on Patentability—PCT/US07/073523, International Search Authority—The International Bureau of WIPO—Geneva, Switzerland—Jan. 14, 2009.

(Continued)

*Primary Examiner* — Shuwang Liu
*Assistant Examiner* — Helene Tayong
(74) *Attorney, Agent, or Firm* — Abdollah Katbab

(57) ABSTRACT

A multi-carrier transmitter capable of transmitting on one or multiple frequency channels simultaneously is described. In one design, the multi-carrier transmitter includes at least one processor and a single radio frequency (RF) transmit chain. The processor(s) may generate output chips for each of multiple frequency channels, digitally filter and upsample the output chips for each frequency channel to obtain filtered samples, and digitally upconvert the filtered samples for each frequency channel to a different frequency to obtain upconverted samples. The processor(s) may then combine the upconverted samples for the multiple frequency channels to obtain composite samples, perform pre-distortion on the composite samples for I/Q mismatch compensation, and upsample the pre-distorted samples to obtain output samples. The output samples may be converted to an analog signal with a wideband DAC. The RF transmit chain may process the analog signal to generate an RF output signal.

23 Claims, 10 Drawing Sheets

(56) References Cited

U.S. PATENT DOCUMENTS

| | | | |
|---|---|---|---|
| 7,542,519 B2 | 6/2009 | McCallister et al. | |
| 8,014,476 B2 * | 9/2011 | Filipovic et al. | 375/344 |
| 2002/0154678 A1 | 10/2002 | Doetsch et al. | |
| 2003/0076807 A1 * | 4/2003 | Miya et al. | 370/342 |
| 2003/0153285 A1 * | 8/2003 | Dekker | 455/104 |
| 2004/0057533 A1 * | 3/2004 | Kermalli | 375/296 |
| 2005/0195763 A1 * | 9/2005 | Kadous et al. | 370/328 |
| 2006/0063490 A1 * | 3/2006 | Bader et al. | 455/45 |
| 2006/0189282 A1 | 8/2006 | Hasegawa et al. | |
| 2007/0018728 A1 * | 1/2007 | Volkov | 330/254 |
| 2007/0077955 A1 * | 4/2007 | Zhou et al. | 455/522 |
| 2007/0190952 A1 * | 8/2007 | Waheed et al. | 455/114.3 |
| 2007/0201582 A1 | 8/2007 | Okada et al. | |
| 2011/0090946 A1 | 4/2011 | Mergen et al. | |
| 2013/0003816 A1 * | 1/2013 | Kim | 375/231 |

FOREIGN PATENT DOCUMENTS

| | | |
|---|---|---|
| JP | 11313042 A | 11/1999 |
| JP | 2001127736 A | 5/2001 |
| JP | 2001517017 A | 10/2001 |
| JP | 2002305489 A | 10/2002 |
| JP | 2003510947 A | 3/2003 |
| JP | 2004506365 A | 2/2004 |
| JP | 2004166245 A | 6/2004 |
| JP | 2005020505 A | 1/2005 |
| JP | 2005311710 A | 11/2005 |
| WO | WO0213370 A2 | 2/2002 |
| WO | 2006038085 | 4/2006 |
| WO | 2006049140 | 5/2006 |

OTHER PUBLICATIONS

International Search Report—PCT/US07/073553, International Search Authority—European Patent Office—May 29, 2008.

Written Opinion—PCT/US07/073553, International Search Authority—European Patent Office—May 29, 2008.

Taiwan Search Report—TW096125917—TIPO—Mar. 30, 2011.

\* cited by examiner

MULTI-CARRIER TRANSMITTER FOR WIRELESS COMMUNICATION

RELATED APPLICATION

The present application for patent claims priority to Provisional Application Ser. No. 60/831,044, entitled "MODULATION OF MULTIPLE DATA CHANNELS WITH A SINGLE RF TRANSMIT CHAIN," filed Jul. 14, 2006, assigned to the assignee hereof, and expressly incorporated herein by reference.

TECHNICAL FIELD

The present disclosure relates generally to communication, and more specifically to a transmitter for a wireless communication system.

BACKGROUND

Wireless communication systems are widely deployed to provide various communication services such as voice, video, packet data, messaging, broadcast, etc. These systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

Data usage for wireless communication systems continually grows due to increasing number of users as well as emergence of new applications with higher data requirements. A system may support a particular maximum data rate on one frequency channel under favorable channel conditions. This maximum data rate is typically determined by system design. To increase capacity, the system may utilize multiple frequency channels for transmission. However, the design complexity and cost of a transmitter may increase substantially in order to support transmission on multiple frequency channels.

There is therefore a need in the art for a cost effective transmitter that can support operation on multiple frequency channels.

SUMMARY

A multi-carrier transmitter capable of transmitting on one or multiple frequency channels simultaneously using a single radio frequency (RF) transmit chain is described herein. The single RF transmit chain may be wideband and designed for a particular maximum number of (T) frequency channels. Up to T signals may be transmitted simultaneously on up to T frequency channels using this single RF transmit chain.

In one design, the multi-carrier transmitter includes at least one processor and one RF transmit chain. The processor(s) may generate output chips for each of multiple frequency channels in accordance with a particular system such as a High Rate Packet Data (HRPD) system. The output chips for each frequency channel may be scaled with a gain selected based on the transmit power for that frequency channel. The processor(s) may digitally filter and upsample the output chips for each frequency channel to obtain filtered samples and may digitally upconvert the filtered samples for each frequency channel to a different frequency to obtain upconverted samples. The processor(s) may combine the upconverted samples for the multiple frequency channels to obtain composite samples, perform pre-distortion on the composite samples to compensate for gain and phase mismatches of subsequent analog quadrature upconversion, and upsample the pre-distorted samples to obtain output samples. The output samples may be converted to an analog signal with a wideband digital-to-analog converter (DAC). The RF transmit chain may then process (e.g., filter, quadrature upconvert, and amplify) the analog signal to generate an RF output signal.

Various aspects and features of the disclosure are described in further detail below.

DETAILED DESCRIPTION

The multi-carrier transmitter described herein may be used for various wireless communication systems such as CDMA, TDMA, FDMA, OFDMA, and SC-FDMA systems. The terms "system" and "network" are often used interchangeably. A CDMA system may implement a radio technology such as cdma2000, Universal Terrestrial Radio Access (UTRA), etc. cdma2000 covers IS-2000, IS-95, and IS-856 standards. UTRA includes Wideband-CDMA (W-CDMA) and Low Chip Rate (LCR). A TDMA system may implement a radio technology such as Global System for Mobile Communications (GSM). An OFDMA system may implement a radio technology such as Evolved UTRA (E-UTRA), IEEE 802.11, IEEE 802.16, IEEE 802.20, Flash-OFDM®, etc. These various radio technologies and standards are known in the art. UTRA, E-UTRA, and GSM are described in documents from an organization named "3rd Generation Partnership Project" (3GPP). cdma2000 is described in documents from an organization named "3rd Generation Partnership Project 2" (3GPP2). 3GPP and 3GPP2 documents are publicly available.

For clarity, certain aspects of the multi-carrier transmitter are described for an HRPD system that implements IS-856. HRPD is also referred to as CDMA2000 1xEV-DO (Evolution-Data Optimized), 1xEV-DO, 1x-DO, DO, High Data Rate (HDR), etc. The terms "HRPD", "EV-DO", and "DO" are often used interchangeably. HRPD is described in 3GPP2 C.S0024-B, entitled "cdma2000 High Rate Packet Data Air Interface Specification," dated March 2007, which is publicly available. For clarity, HRPD terminology is used in much of the description below.

The multi-carrier transmitter described herein may be used for an access terminal as well as an access point. An access point is generally a fixed station that communicates with the access terminals and may also be referred to as a base station, a Node B, etc. An access terminal may be stationary or mobile and may also be referred to as a mobile station, a user equipment (UE), a mobile equipment, a terminal, a subscriber unit, a station, etc. An access terminal may be a cellular phone, a personal digital assistant (PDA), a handset, a wireless communication device, a handheld device, a wireless modem, a laptop computer, etc. For clarity, the use of the multi-carrier transmitter for an access terminal is described below.

The multi-carrier transmitter can transmit one or multiple CDMA signals simultaneously. Each CDMA signal may be sent on a different CDMA channel. A CDMA channel is a frequency channel for one CDMA signal and is 1.2288 MHz wide in HRPD. A CDMA channel is also commonly referred to as a carrier.

Figure 1:
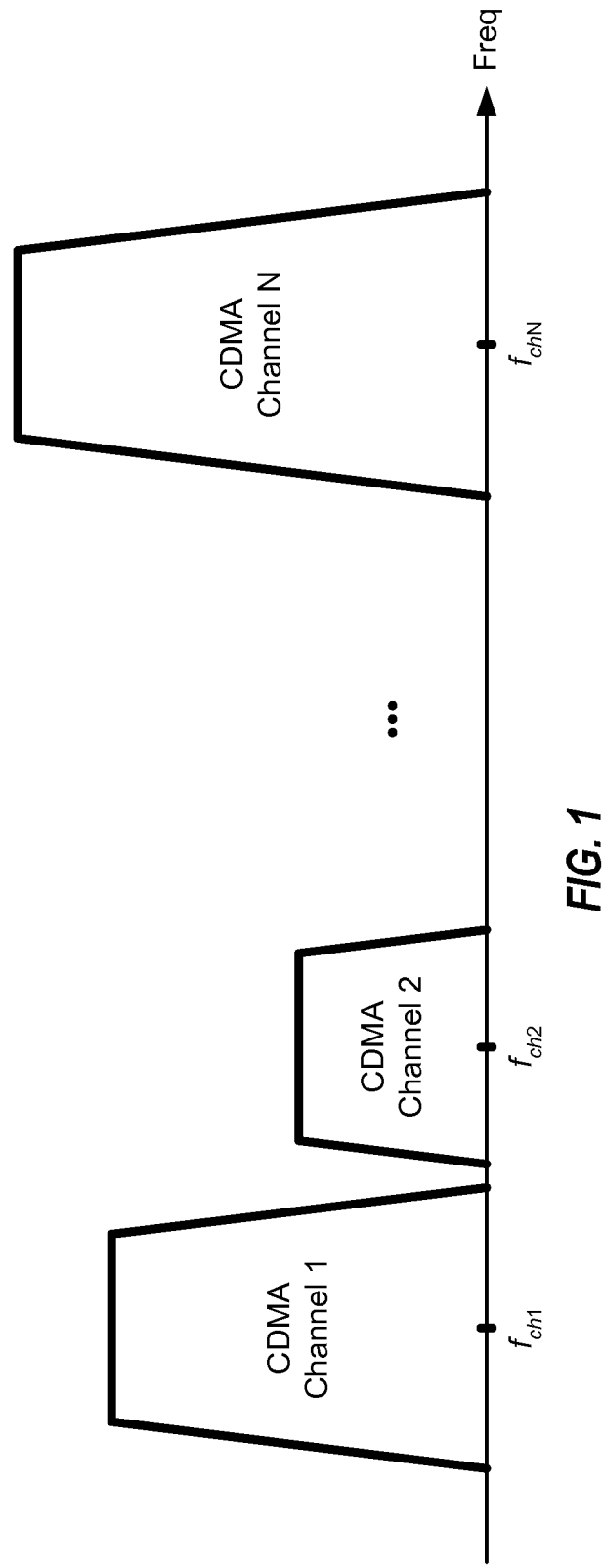
FIG. 1 shows transmission of CDMA signals on multiple CDMA channels.

FIG. 1 shows an example transmission of N CDMA signals on N CDMA channels, where N≥1 in general and N>1 for multi-carrier operation. In this example, CDMA channel 1 has a carrier frequency of $f_{ch1}$, CDMA channel 2 has a carrier frequency of $f_{ch2}$, and so on, and CDMA channel N has a carrier frequency of $f_{chN}$. The carrier frequencies are typically selected such that the CDMA channels are spaced sufficiently far apart to reduce inter-channel interference. In general, the carrier frequencies of the N CDMA channels may or may not be related to one another. The carrier frequency of each CDMA channel may be selected independently subject to a minimum inter-channel spacing criterion. The carrier frequencies may be evenly spaced across frequency and separated by a fixed frequency spacing of $f_{spacing}$, which may be 1.2288 MHz or some larger value. The N CDMA signals may be transmitted at different power levels (as shown in FIG. 1) or at the same power level. The N CDMA signals may carry any type of data for any service such as voice, video, packet data, text messaging, etc. The N CDMA signals may be sent to the same access point or to different access points.

It is desirable to support transmission of one or multiple CDMA channels using as little circuitry as possible in order to reduce cost, lower power consumption, improve reliability, and obtain other benefits. T different RF transmit chains may be used to generate up to T CDMA signals for up to T CDMA channels, where T is the maximum number of CDMA signals that can be sent simultaneously. However, the T RF transmit chains may significantly increase the cost of an access terminal.

In an aspect, the multi-carrier transmitter employs a single RF transmit chain to support simultaneous transmission of up to T CDMA signals on up to T different CDMA channels. The single RF transmit chain may be wideband and designed for T adjacent CDMA channels, where T may be any suitable value. N CDMA signals may be transmitted using this single RF transmit chain, where N may be up to T. The multi-carrier transmitter may be both power efficient and cost effective due to the use of a single RF transmit chain.

Figure 2:
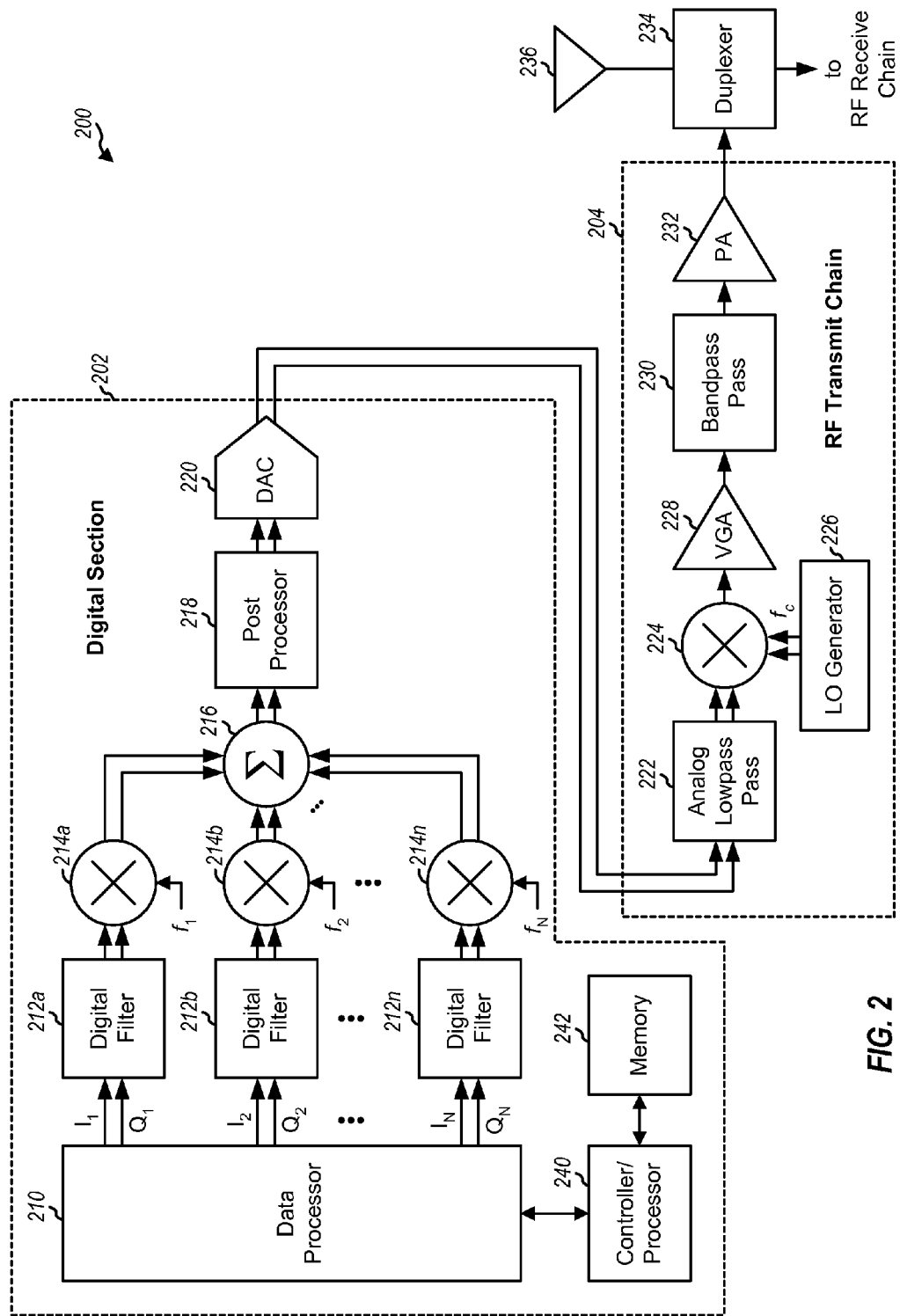
FIG. 2 shows a block diagram of a multi-carrier transmitter.

FIG. 2 shows a block diagram of a design of a multi-carrier transmitter 200, which may be used for an access terminal. Multi-carrier transmitter 200 includes a digital section 202 and an RF transmit chain 204.

Within digital section 202, a data processor 210 processes data, pilot, and control information and provides N output chip streams for N CDMA signals to N digital filter 212a through 212n. A chip is typically a complex value sent in one chip period, which is a time duration determined by a system. Each output chip stream may be at a chip rate (c×1), which is 1.2288 megachips/second (Mcps) for HRPD. Each digital filter 212 filters its output chip stream, performs upsampling, and provides a filtered sample stream to a rotator 214. Each filtered sample stream may be at a sample rate of $f_{sample}$. The sample rate may be fixed and selected based on the maximum number of CDMA signals that can be transmitted simultaneously. Alternatively, the sample rate may be configurable and selected based on the number of CDMA signals being transmitted simultaneously. Each rotator 214 operates as a digital upconverter, frequency upconverts its filtered sample stream with a digital local oscillator (LO) signal, and provides an upconverted sample stream. The digital LO signal for the CDMA signal sent on CDMA channel n has a frequency of $f_n$, which is determined by the carrier frequency $f_{chn}$ of CDMA channel n and the frequency $f_c$ of an analog LO signal used for upconversion to RF. A summer 216 receives and sums the N upconverted sample streams from N rotators 214a through 214n and provides a composite sample stream. A post processor 218 performs post processing on the composite sample stream and provides an output sample stream. A DAC 220 converts the output sample stream to analog and provides an analog baseband signal containing the N CDMA signals.

An RF transmit chain may implement a super-heterodyne architecture or a direct-conversion architecture. In the super-heterodyne architecture, a baseband signal is frequency upconverted in multiple stages, e.g., from baseband to an intermediate frequency (IF) in one stage, and then from IF to RF in another stage. In the direct-conversion architecture, which is also referred to as a zero-IF architecture, the baseband signal is frequency upconverted from baseband directly to RF in one stage. The super-heterodyne and direct-conversion architectures may use different circuit blocks and/or have different circuit requirements. The following description assumes the use of the direct-conversion architecture.

Within RF transmit chain 204, an analog lowpass filter 222 filters the analog baseband signal from DAC 220 to remove images caused by the digital-to-analog conversion and provides a filtered signal. A mixer 224 frequency upconverts the filtered signal from baseband to RF with an analog LO signal from an LO generator 226. LO generator 226 may include a voltage controlled oscillator (VCO), a phase locked loop (PLL), a reference oscillator, etc. A variable gain amplifier (VGA) 228 amplifies the upconverted signal from mixer 224 with a variable gain. A bandpass filter 230 filters the signal from VGA 228 to remove images caused by the frequency upconversion. Bandpass filter 230 may be a surface acoustic wave (SAW) filter, a ceramic filter, or some other type of filter. A power amplifier (PA) 232 amplifies the signal from filter 230 and provides an RF output signal having the proper power level. The RF output signal is routed through a duplexer 234 and transmitted via an antenna 236. As shown in FIG. 2, the signals from data processor 210 to mixer 224 are typically complex signals having inphase (I) and quadrature (Q) components.

DAC 220 and RF transmit chain 204 may be wideband to support simultaneous transmission of N CDMA signals on N CDMA channels. DAC 220 may be operated at a sufficiently high clock rate and may have sufficient resolution for conversion of a digital sample stream containing all N CDMA signals. Analog lowpass filter 222 may have a fixed or variable bandwidth that may be sufficiently wide to pass all of the CDMA signals being sent simultaneously. The subsequent analog circuit blocks may also be wideband to pass all of the CDMA signals. Bandpass filter 230 may be wideband and may pass an entire frequency band, e.g., from 824 to 849 MHz for cellular band and from 1850 to 1910 MHz for Personal Communications Service (PCS) band.

FIG. 2 shows a specific design of RF transmit chain 204. In general, an RF transmit chain may include one or more stages of amplifier, filter, mixer, etc. These circuit blocks may be arranged differently from the configuration shown in FIG. 2. An RF transmit chain may also include different and/or additional circuit blocks not shown in FIG. 2. All or a portion of RF transmit chain 204 may be implemented on one or more RF integrated circuits (RFICs), mixed-signal ICs, etc. For example, analog lowpass filter 222, mixer 224, LO generator 226, and VGA 228 may be implemented on an RFIC, e.g., an RF transmitter (RFT) or an RF transmitter/receiver (RTR) chip.

Data processor 210 may include various processing units for data transmission and other functions. For example, data processor 210 may include a digital signal processor (DSP), a reduced instruction set computer (RISC) processor, a central processing unit (CPU), etc. A controller/processor 240 may control the operation of multi-carrier transmitter 200. Memory 242 may store program codes and data for multi-carrier transmitter 200. Data processor 210, controller/processor 240, and/or memory 242 may be implemented on one or more application specific integrated circuits (ASICs) and/or other ICs.

Multi-carrier transmitter 200 may be used in conjunction with a multi-carrier receiver that can receive one or more CDMA channels. Duplexer 234 may route an RF received signal from antenna 236 to the multi-carrier receiver, which is not shown in FIG. 2. The multi-carrier receiver may process the RF received signal to recover data and control information sent on one or more CDMA channels.

In HRPD, an access terminal may send one or more data channels, pilot channels, reverse rate indicator (RRI) channels, auxiliary pilot channels, data rate control (DRC) channels, acknowledgement (ACK) channels, and data source control (DSC) channels in a CDMA signal on the reverse link to an access point. A data channel carries user data. A pilot channel carries pilot, which is data that is known a priori by the access terminal and the access point. An auxiliary pilot channel carries additional pilot. An RRI channel indicates the rate of a data channel. A DRC channel indicates the rate at which the access terminal can receive a forward traffic channel and a sector from which the access terminal wishes to receive the forward traffic channel. A DSC channel indicates a data source from which the access terminal wishes to receive the forward traffic channel. An ACK channel indicates success or failure of data reception on the forward traffic channel. The DRC, ACK and DSC channels are sent on the reverse link to support data transmission on the forward link. The DRC, ACK and DSC channels are also referred to as reverse overhead channels for forward link, or simply ROC channels.

An access terminal may receive data on one or more forward CDMA channels and may transmit data on one or more reverse CDMA channels. A forward CDMA channel is a CDMA channel on the forward link. A reverse CDMA channel is a CDMA channel on the reverse link. HRPD supports three modes of sending the ROC channels for the forward CDMA channels.

In a NoFeedbackMultiplexing mode, each forward CDMA channel is associated with a different reverse CDMA channel. The ROC channels for each forward CDMA channel are sent on the associated reverse CDMA channel. One user long code is used for spreading for all reverse CDMA channels. A user long code is a pseudo-random number (PN) sequence that is specific to an access terminal.

In a BasicFeedbackMultiplexing mode, multiple forward CDMA channels may be associated with a given reverse CDMA channel. The ROC channels for these multiple forward CDMA channels are sent on the associated reverse CDMA channel using different long codes, one long code for each forward CDMA channel. This allows the ROC channels for different forward CDMA channels to be distinguished.

In an EnhancedFeedbackMultiplexing mode, up to 16 forward CDMA channels may be associated with a given reverse CDMA channel. The ROC channels for up to four forward CDMA channels may be multiplexed in time and/or with different Walsh codes and sent on the associated reverse CDMA channel using a different long code.

Table 1 lists the three feedback multiplexing modes in HRPD and provides a short description for each mode.

TABLE 1

| Mode | Description |
| --- | --- |
| NoFeedback-Multiplexing | The ROC channels for each forward CDMA channel are sent using a common long code on an associated reverse CDMA channel. |
| BasicFeedback-Multiplexing | The ROC channels for multiple forward CDMA channels are sent using different long codes on an associated reverse CDMA channel. |
| EnhancedFeedback-Multiplexing | The ROC channels for up to 16 forward CDMA channels are sent on an associated reverse CDMA channel, with the ROC channels for up to four forward CDMA channels being multiplexed in time and/or code and sent using a different long code. |

Figure 3:
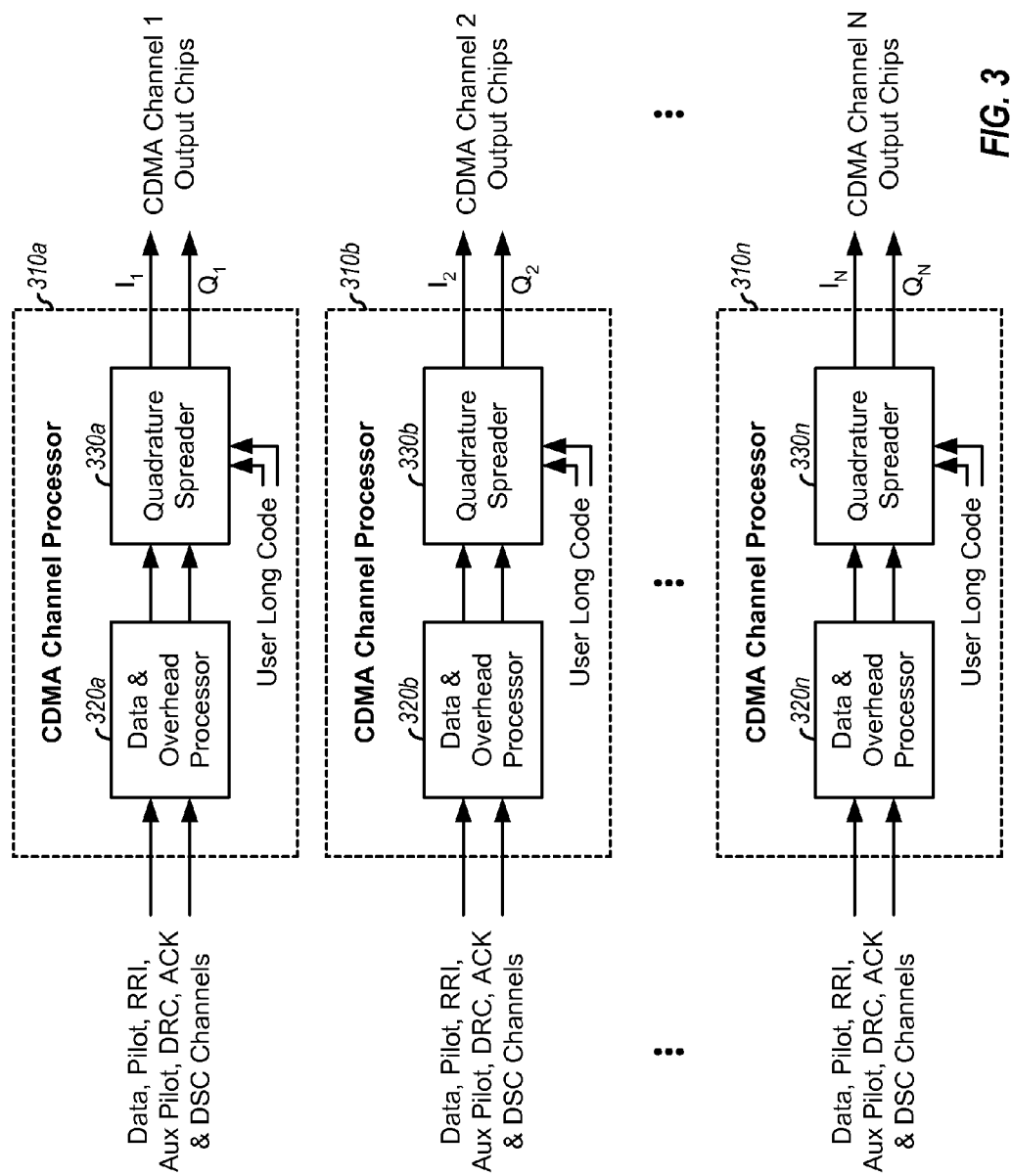
FIG. 3 shows processing for a NoFeedbackMultiplexing mode in HRPD.

FIG. 3 shows processing for the NoFeedbackMultiplexing mode. N CDMA channel processors 310a through 310n perform processing for N reverse CDMA channels 1 through N, respectively. Within CDMA channel processor 310a, a data and overhead processor 320a performs processing for (i) the data, pilot, RRI, and auxiliary pilot channels for reverse CDMA channel 1 and (ii) the ROC channels (DRC, ACK and DSC channels) for the associated forward CDMA channel. A quadrature spreader 330a spreads the chips from processor 320a with a user long code and provides output chips for reverse CDMA channel 1. CDMA channel processors 310b through 310n perform processing for reverse CDMA channels 2 through N, respectively, in similar manner. The same user long code is used for all N reverse CDMA channels.

Figure 4:
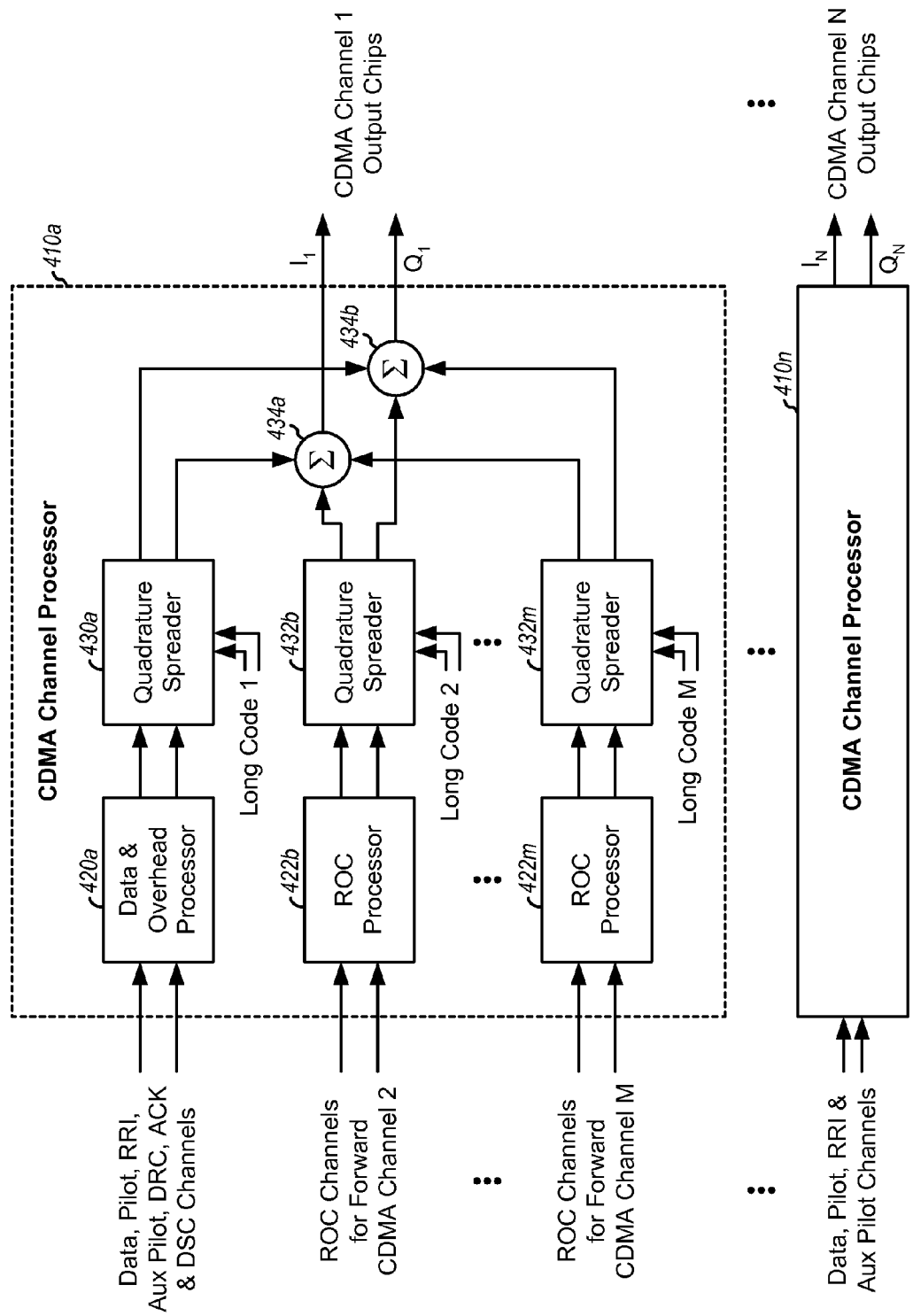
FIG. 4 shows processing for a BasicFeedbackMultiplexing mode in HRPD.

FIG. 4 shows processing for the BasicFeedbackMultiplexing mode. N CDMA channel processors 410a through 410n perform processing for N reverse CDMA channels 1 through N, respectively. Within CDMA channel processor 410a, a data and overhead processor 420a and a quadrature spreader 430a perform processing for reverse CDMA channel 1 in the same manner as processor 320a and quadrature spreader 330a, respectively, in FIG. 3. ROC processors 422b through 422m perform processing for the ROC channels for forward CDMA channels 2 through M, respectively, which are associated with reverse CDMA channel 1. Quadrature spreaders 432b through 432m spread the chips from ROC processors 422b through 422m, respectively, with long codes 2 through M, respectively. M different long codes may be used for the ROC channels for the M forward CDMA channels mapped to reverse CDMA channel 1. A summer 434a sums the I chips from spreaders 430a and 432b through 432m and provides the I output chips for reverse CDMA channel 1. A summer 434b sums the Q chips from spreaders 430a and 432b through 432m and provides the Q output chips for reverse CDMA channel 1.

CDMA channel processors 410b through 410n perform processing for reverse CDMA channels 2 through N, respectively. Each of reverse CDMA channels 2 through N may carry the ROC channels for zero, one, or multiple forward CDMA channels. For each of CDMA channel processors 410a through 410n, the data, pilot, RRI, and auxiliary pilot channels are spread with the same user long code 1, and the ROC channels for different forward CDMA channels are spread with different long codes.

Figure 5:
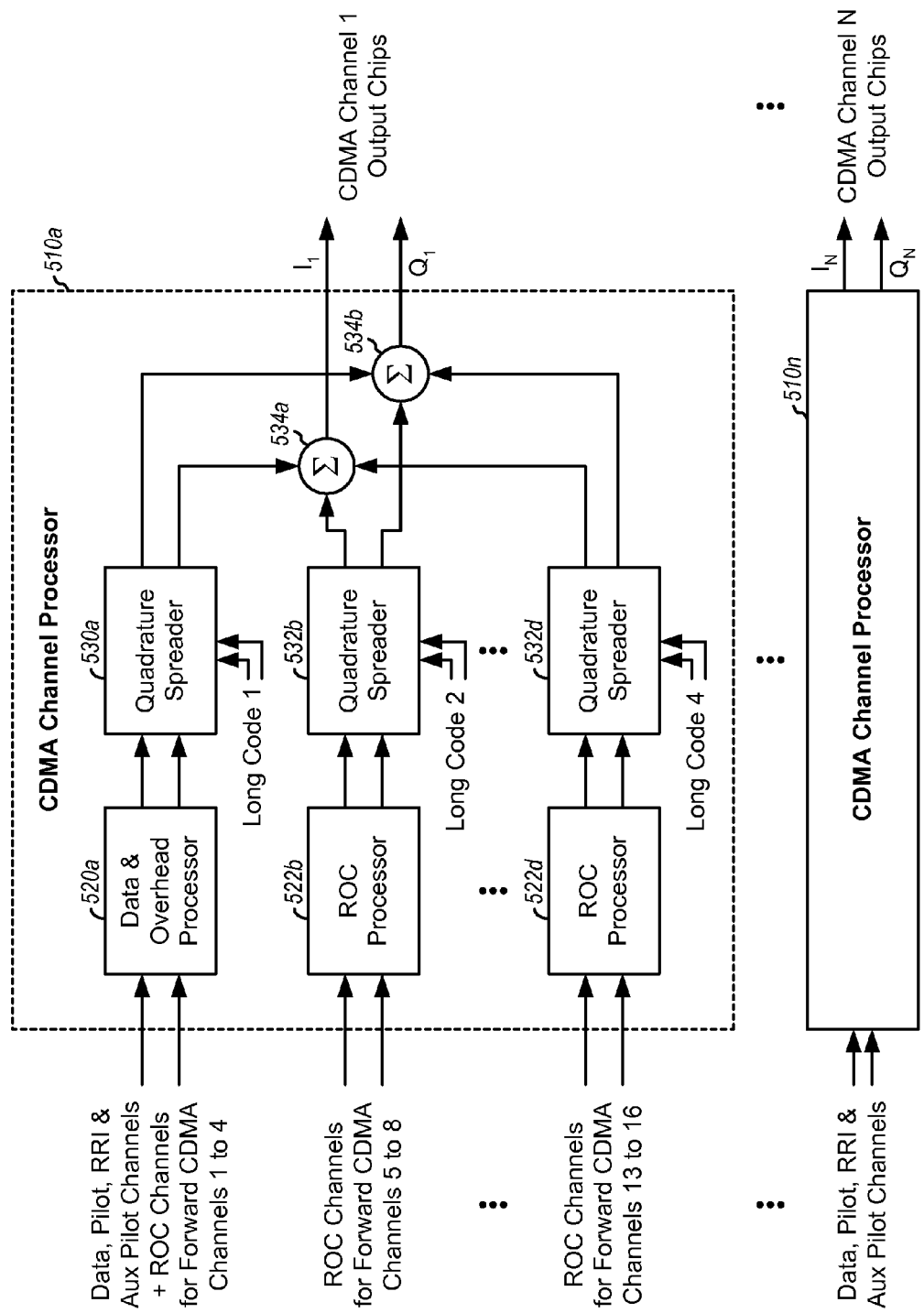
FIG. 5 shows processing for an EnhancedFeedbackMultiplexing mode in HRPD.

FIG. 5 shows processing for the EnhancedFeedbackMultiplexing mode. N CDMA channel processors 510a through 510n perform processing for N reverse CDMA channels 1 through N, respectively. Within CDMA channel processor 510a, a data and overhead processor 520a perform processing for (i) the data, pilot, RRI, and auxiliary pilot channels for reverse CDMA channel 1 and (ii) the ROC channels for associated forward CDMA channels 1 through 4. ROC processors 522b through 522d perform processing for the ROC channels for the other forward CDMA channels associated reverse CDMA channel 1. Each ROC processor 522 performs processing for the ROC channels for up to four associated forward CDMA channels. Quadrature spreaders 532b through 532d spread the chips from ROC processors 522b through 522d, respectively, with long codes 2 through 4, respectively. Up to four different long codes may be used for up to 16 forward CDMA channels mapped to reverse CDMA channel 1. Summers 534a and 534b sum the I and Q chips, respectively, from spreaders 530a and 532b through 532m and provide the I and Q output chips, respectively, for reverse CDMA channel 1.

CDMA channel processors 510b through 510n perform processing for reverse CDMA channels 2 through N, respectively. Each of reverse CDMA channels 2 through N may carry the ROC channels for zero, one, or multiple forward CDMA channels. For each of CDMA channel processors 510a through 510n, the data, pilot, RRI, and auxiliary pilot channels are spread with the same user long code 1, and the ROC channels for different sets of up to four forward CDMA channels are spread with different long codes.

Figure 6:
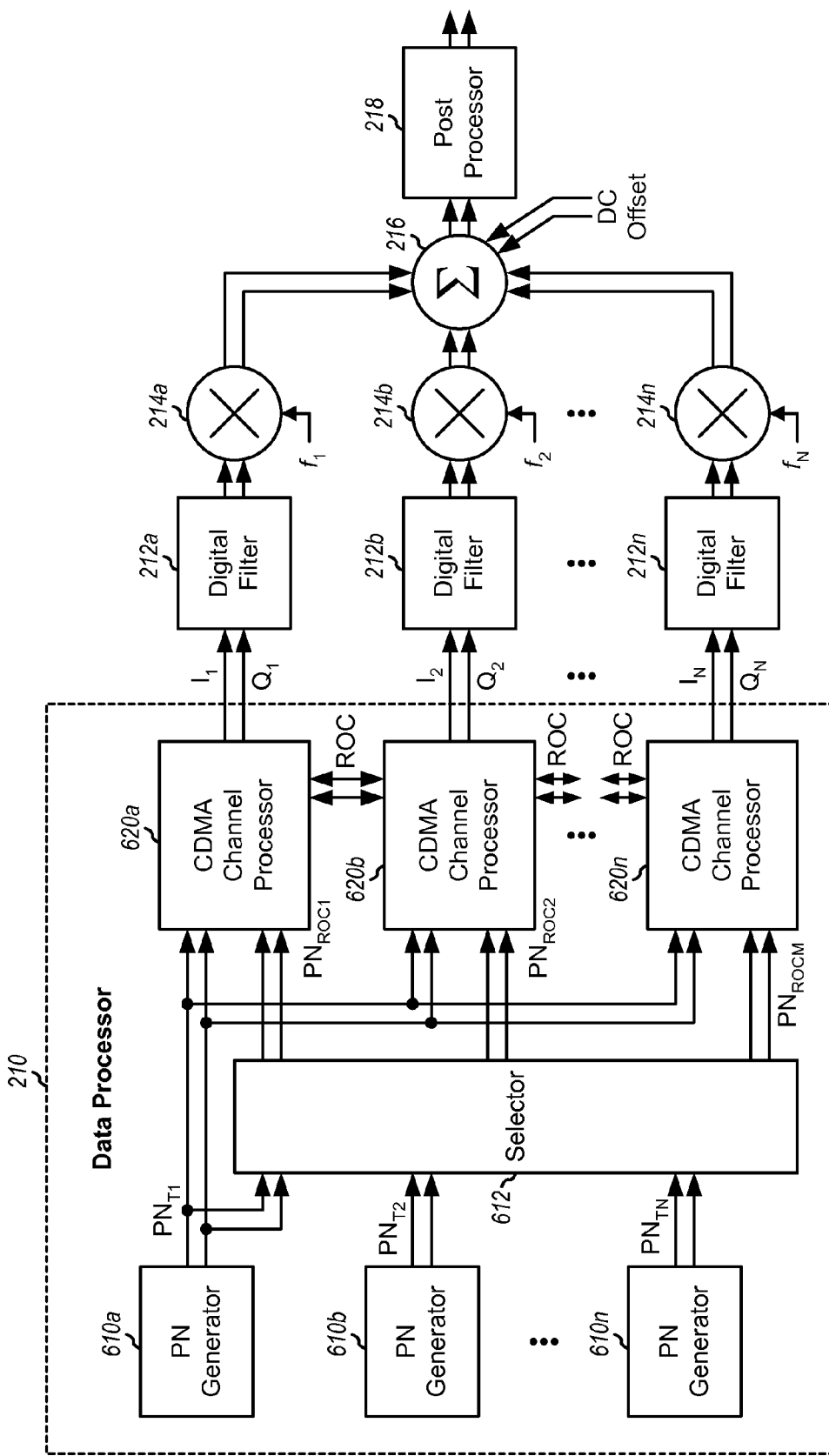
FIG. 6 shows a data processor for all three feedback multiplexing modes in HRPD.

FIG. 6 shows a block diagram of a design of data processor 210 for all three feedback multiplexing modes in HRPD. In this design, data processor 210 supports transmission on up to N reverse CDMA channels and feedback for up to N forward CDMA channels. Data processor 210 includes N CDMA channel processors 620a through 620n. Each CDMA channel processor 620 performs processing for (i) the data, pilot, RRI, and auxiliary pilot channels for one reverse CDMA channel and (ii) the ROC channels for one forward CDMA channel.

Within data processor 210, N PN generators 610a through 610n generate N different long codes $PN_{T1}$ through $PN_{TN}$, respectively, for up to N forward CDMA channels that may be associated with one reverse CDMA channel. PN generator 610a provides its long code $PN_{T1}$ to all N CDMA channel processors 620a through 620n for the N reverse CDMA channels 1 through N, respectively. The long code $PN_{T1}$ is used for the data, pilot, RRI, and auxiliary pilot channels for all N reverse CDMA channels. A selector 612 receives the N long codes from PN generators 610a through 610n and provides an appropriate ROC long code $PN_{ROC}$ to each CDMA channel processor 620. The ROC long code provided to each CDMA channel processor 620 is used for the ROC channels for the forward CDMA channel being processed by that CDMA channel processor. For the NoFeedbackMultiplexing mode, selector 612 provides the long code from PN generator 610a as the ROC long code for all N CDMA channel processors 620a through 620n, so that $PN_{ROC1}=\ldots=PN_{ROCN}=PN_{T1}$. For the BasicFeedbackMultiplexing mode, selector 612 may provide the long codes from PN generators 610a through 610n as the ROC long codes for N CDMA channel processors 620a through 620n, respectively, so that $PN_{ROC1}=PN_{T1}, \ldots,$ and $PN_{ROCN}=PN_{TN}$. For the EnhancedFeedbackMultiplexing mode, selector 612 may provide the long code from each PN generator 610 as the ROC long code for up to four CDMA channel processors 620. In general, the operation of selector 612 is dependent on the selected feedback multiplexing mode and the mapping of the forward CDMA channels to the reverse CDMA channels.

Each CDMA channel processor 620 performs processing for the data, pilot, RRI, and auxiliary pilot channels for one reverse CDMA channel with the long code $PN_{T1}$. Each CDMA channel processor 620 also performs processing for the ROC channels for one forward CDMA channel with the ROC long code $PN_{ROC}$. Each CDMA channel processor 620 may provide its ROC chips to another CDMA channel processor or may receive ROC chips from other CDMA channel processors. Each CDMA channel processor 620 provides output chips for one reverse CDMA channel to an associated digital filter 212.

The output chips from each CDMA channel processor 620 are filtered by an associated digital filter 212 and digitally upconverted by an associated rotator 214. Summer 216 sums the upconverted samples from all N rotators 214a through 214n as well as a DC offset and provides composite samples. The DC offset may be a programmable value that may be used to reduce LO feedthrough of mixer 224 in RF transmit chain 204 in FIG. 2. Calibration may be performed to determine the amount of DC offset that can minimize the amount of LO feedthrough. This DC offset may then be provided to summer 216.

Figure 7:
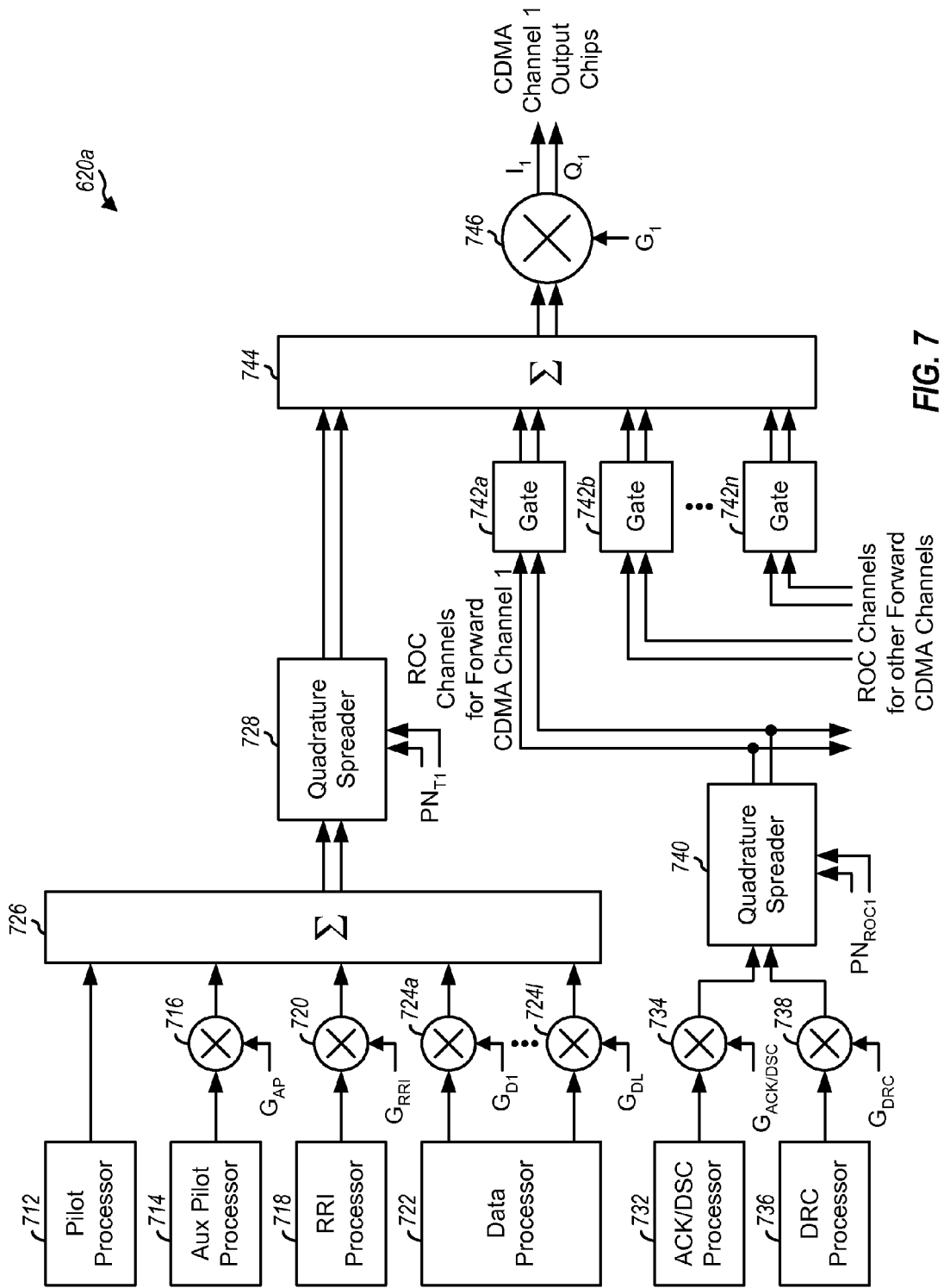
FIG. 7 shows a block diagram of a CDMA channel processor in FIG. 6.

FIG. 7 shows a design of CDMA channel processor 620a in FIG. 6. Within CDMA channel processor 620a, a processor 712 performs processing for pilot and provides pilot chips. A processor 714 performs processing for auxiliary pilot. A multiplier 716 scales the output of processor 714 with a gain $G_{AP}$ and provides auxiliary pilot chips. A processor 718 performs processing for the RRI channel. A multiplier 720 scales the output of processor 718 with a gain $G_{RRI}$ and provides RRI chips. A processor 722 performs processing for L data channels, where $L \geq 1$. Multipliers 724a through 724l scale the outputs of processor 722 for the L data channels with gains $G_{D1}$ through $G_{DL}$, respectively, and provide data chips. A summer 726 sums the chips from processor 712 and multipliers 716, 720, and 724a through 724l. A quadrature spreader 728 spreads the chips from summer 726 with the long code $PN_{T1}$ and provides chips for the data, pilot, RRI, and auxiliary pilot channels for reverse CDMA channel 1.

A processor 732 performs processing for the ACK and DSC channels. A multiplier 734 scales the output of processor 732 with a gain $G_{ACK/DSC}$ and provides ACK/DSC chips. A processor 736 performs processing for the DRC channel. A multiplier 738 scales the output of processor 736 with a gain $G_{DRC}$ and provides DRC chips. A quadrature spreader 740 spreads the chips from multipliers 734 and 738 with the long code $PN_{ROC1}$ and provides ROC chips for forward CDMA channel 1. Gating units 742a through 742n receive the ROC chips for forward CDMA channels 1 through N, respectively. Each gating unit 742 provides its ROC chips to a summer 744 at an appropriate time if the ROC channels for its forward CDMA channel are sent on reverse CDMA channel 1.

Summer 744 sums the chips from spreader 728 and gating units 742a through 742n. A multiplier 746 scales the chips from summer 744 with a gain $G_1$ and provides the output chips for reverse CDMA channel 1. The gain $G_1$ is determined by the transmit power for reverse CDMA channel 1. The gains $G_{AP}, G_{RRI}, G_{D1}$ through $G_{DL}, G_{ACK/DSC}$ and $G_{DRC}$ determine the relative transmit powers for the different data, pilot, and overhead channels sent on reverse CDMA channel 1.

FIG. 7 shows an example design of CDMA channel processor 620a. Each of CDMA channel processors 620b through 620n in FIG. 6 may be implemented in the same manner as CDMA channel processor 620a in FIG. 7. The processing for the N reverse CDMA channels may also be performed in other manners. In another design, each CDMA channel processor performs processing for the data, pilot, RRI, and auxiliary pilot channels for one reverse CDMA channel and may include units 712 through 728 and units 742 through 746 in FIG. 7. One ROC processor may perform processing for the ROC channels for all forward CDMA channels and may provide the ROC chips for each forward CDMA channel to an appropriate CDMA channel processor.

Digital gains $G_1$ through $G_N$ for the N reverse CDMA channels may be set to achieve the desired transmit power for each CDMA channel. The N reverse CDMA channels may have different transmit powers to support different data rates and/or communication with different access points. The gains $G_1$ through $G_N$ may also be set to achieve the desired total transmit power for all N CDMA channels and may also be used for automatic gain control (AGC). In one design, the gain of VGA 228 in RF transmit chain 204 may be varied in coarse steps, and the gains $G_1$ through $G_N$ may be varied in fine steps (e.g., 0.25 dB) over a particular range (e.g., 12 dB). The resolution of the gains $G_1$ through $G_N$ (e.g., in terms of number of bits) may be selected based on the maximum difference between the strongest and weakest reverse CDMA channels (which may be 15 dB in one design) and the desired fine step size.

Figure 8:
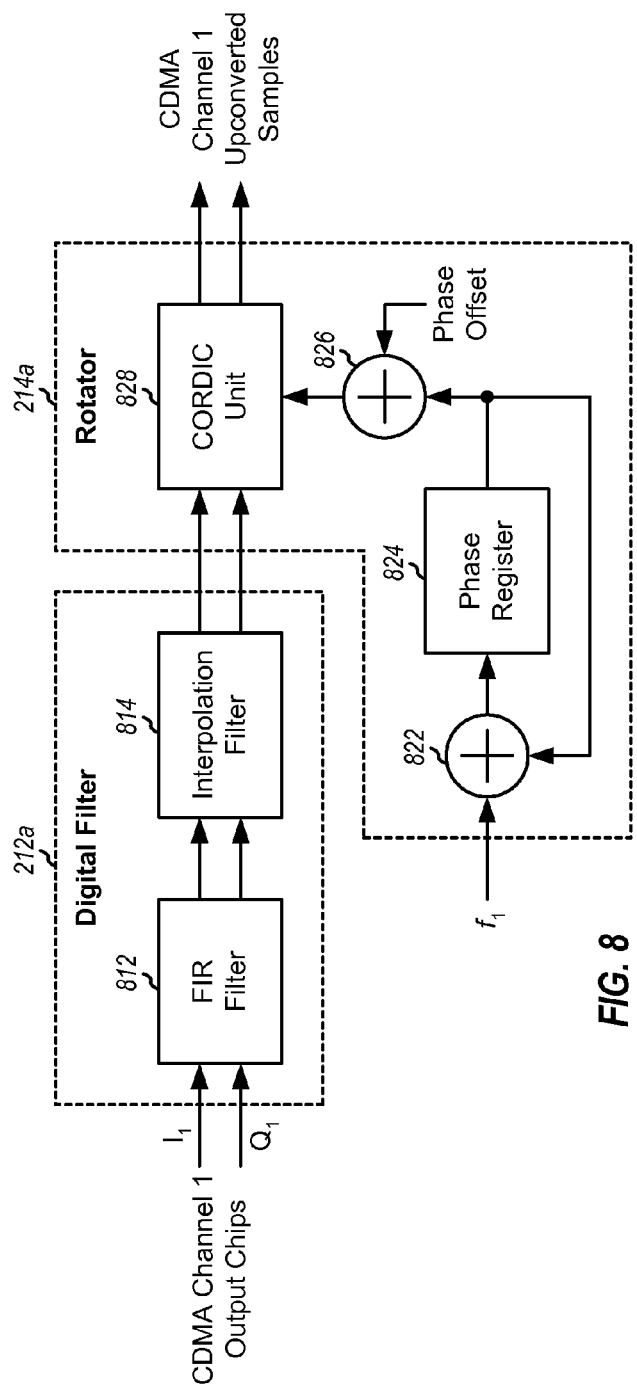
FIG. 8 shows a block diagram of a digital filter and a rotator.

FIG. 8 shows a block diagram of a design of digital filter 212a and rotator 214a for reverse CDMA channel 1. Within digital filter 212a, a finite impulse response (FIR) filter 812 receives and filters the output chips from CDMA channel processor 620a. FIR filter 812 may perform pulse shaping to obtain the desired spectral characteristics for the CDMA signal sent on reverse CDMA channel 1. FIR filter 812 may also upsample the output chips, e.g., from chip rate to four times chip rate (c×4). FIR filter 812 may be implemented with a sufficient number of taps to achieve the desired filter response. An interpolation filter 814 performs interpolation on the samples from FIR filter 812 and provides filtered samples at the sample rate of $f_{sample}$, which may be 16 times chip rate (c×16). Interpolation filter 814 may be implemented with one or more stages, e.g., from c×4 to c×8 in one stage, and from c×8 to c×16 in another stage. The sample rate $f_{sample}$ may be selected based on the maximum frequency separation between the lowest and highest CDMA channels supported by multi-carrier transmitter 200. The upsampling by filter 812 and/or filter 814 allows the filtered samples to be digitally upconverted to a higher frequency by subsequent rotator 214a.

Within rotator 214a, a summer 822 and a register 824 form a phase accumulator that accumulates the frequency $f_1$ for CDMA channel 1 in each sample period. The bit-width of the phase accumulator may be selected based on the highest upconversion frequency and the desired frequency resolution. For example, a 23-bit phase accumulator supports a frequency range of ±9.83 MHz with a frequency resolution of 2.34 Hz. In each sample period, a summer 826 sums the current phase value from register 824 with a phase offset, which may be used to account for different phases associated with different states of VGA 228 or PA 232 in RF transmit chain 204.

In each sample period, a Coordinate Rotational Digital Computer (CORDIC) unit 828 rotates a complex filtered sample from digital filter 212a by a phase from summer 826 and provides an upconverted sample. CORDIC unit 828 implements an iterative algorithm that allows for fast hardware calculation of trigonometric functions using simple shift and add/subtract hardware. CORDIC unit 828 can rotate a complex sample in an iterative manner, with more iterations producing higher accuracy for the resultant output. For example, 9 iterations can provide an accuracy of ±0.22 degrees. In one design, CORDIC unit 828 may be operated at a clock speed of $Q \cdot f_{sample}$ to provide an upconverted sample in each sample period with a delay of one sample period, where Q is the number of iterations. In another design, CORDIC unit 828 may be implemented with multiple pipeline stages and operated at a clock speed lower than $Q \cdot f_{sample}$. For example, CORDIC unit 828 may be implemented with Q pipeline stages and operated at a clock speed of $f_{sample}$ and may then provide an upconverted sample in each sample period with a pipeline delay of Q sample periods.

Figure 9:
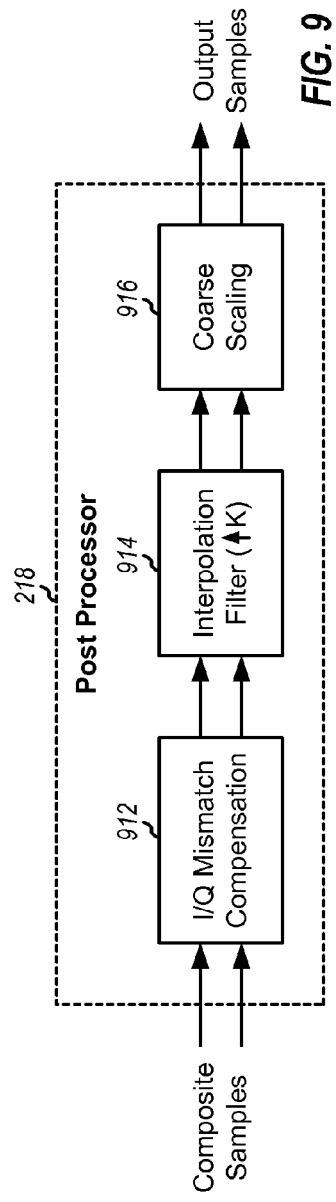
FIG. 9 shows a block diagram of a post processor.

FIG. 9 shows a block diagram of a design of post processor 218 in FIGS. 2 and 6. Within post processor 218, an I/Q mismatch compensation unit 912 performs digital pre-distortion to account for gain and phase (or I/Q) mismatches between the I and Q paths in the quadrature upconversion to RF. One set of DAC 220, analog lowpass filter 222, and mixer 224 may be used for each of the I and Q paths. The gain mismatch may be caused by different gains for the DACs, analog lowpass filters, and mixers for the I and Q paths. The phase mismatch may result from the I and Q LO signals from LO generator 226 not being exactly 90° out of phase. The gain and/or phase mismatch may result in a residual sideband energy (RSB) image being generated in an output waveform from mixer 224. This RSB image may degrade performance, especially when there is a large difference in the transmit powers of the N CDMA signals being sent simultaneously, so that the RSB image may be relatively large in comparison to the weakest CDMA channel.

An output from of ideal quadrature upconverter may be expressed as:

$$Y(t) = X_I(t) \cdot \cos(\omega_c t) - X_Q(t) \cdot \sin(\omega_c t), \quad \text{Eq (1)}$$

where
$X_I(t)$ and $X_Q(t)$ are I and Q baseband signals provided to the upconverter,
$Y(t)$ is the upconverted signal from the upconverter, and
$\omega_c = 2\pi \cdot f_c$ is the LO frequency in radians/second.

An output of a non-ideal quadrature upconverter may be expressed as:

$$Y(t) = X_I(t) \cdot \cos(\omega_c t) - K \cdot X_Q(t) \cdot \sin(\omega_c t + \theta), \quad \text{Eq (2)}$$

where K is the gain mismatch and θ is the phase mismatch. Equation (2) lumps both the gain and phase mismatches in the Q component.

The pre-distortion to compensate for the gain and phase mismatches may be expressed as:

$$X_{I,pre-dis}(t) = X_I(t) + A \cdot X_Q(t), \text{ and} \quad \text{Eq (3)}$$

$$X_{Q,pre-dis}(t) = B \cdot X_Q(t), \quad \text{Eq (4)}$$

where $X_{I,pre-dis}(t)$ and $X_{Q,pre-dis}(t)$ are I and Q pre-distorted signals,
A=tan φ and B=1/(α cos φ),
α is an estimate of the gain mismatch, and
φ is an estimate of the phase mismatch.

Parameters α and φ may be obtained from calibration of RF transmit chain 204. If the estimation of the gain and phase mismatches is accurate so that α≈K and φ≈θ, then the upconverted signal with pre-distortion approaches the ideal upconverted signal shown in equation (1).

I/Q mismatch compensation unit 912 receives the I and Q composite samples from summer 216 and generates I and Q pre-distorted samples, as shown in equations (3) and (4). The I and Q composite samples from summer 216 correspond to $X_I(t)$ and $X_Q(t)$ in equations (3) and (4), and the I and Q pre-distorted samples from unit 912 correspond to $X_{I,pre\text{-}dis}(t)$ and $X_{Q,pre\text{-}dis}(t)$.

An interpolation filter 914 performs interpolation on the samples from unit 912 and provides samples at a sample rate of $f_{out}$, which may be K times the sample rate $f_{sample}$, where K may be a selectable value of 1, 2, 4, etc. Interpolation filter 914 may be designed with a frequency response having small passband droop (e.g., 0.2 dB or less) and high rejection of images from the prior upsampling by digital filters 212a through 212n. Interpolation filter 914 may be implemented with one or more stages, e.g., from c×16 to c×32 in one stage, and from c×32 to c×64 in another stage. The rejection provided by filter 914 allows for use of a fixed wideband analog lowpass filter 222 to meet spurious emission requirements.

A coarse scaling unit 916 may scale the samples from filter 914 by a coarse gain (e.g., 4, 2, 1, 0.5, 0.25, etc.) by shifting the bits of each sample either left or right by a desired number of bits. Scaling unit 916 may be used for coarse digital gain control whereas multiplier 746 in each of CDMA channel processor 620a through 620n may be used for fine digital gain control.

Referring back to FIG. 2, analog lowpass filter 222 provides suppression of images in the analog baseband signal from DAC 220 in order to meet spurious emission requirements. The analog baseband signal contains an image at the DAC clock rate (e.g., c×64) and images at the interpolation clock rates (e.g., c×16 and c×32). The analog baseband signal also has a sinc roll-off due to a sample-and-hold circuit within DAC 220. This sinc roll-off may be accounted for digitally, e.g., by filter 914 in FIG. 9. In one design, a fixed wideband filter may be used for analog lowpass filter 222 and may have its bandwidth set at twice the highest supported signal bandwidth in order to limit the amount of inband droop. This filter may be a Butterworth filter or some other filter and may be of a suitable order (e.g., second order). This filter may provide the desired rejection of the images when the samples are sufficiently filtered by interpolation filters 814 and 914 in FIGS. 8 and 9, respectively. In another design, a variable filter may be used for analog lowpass filter 222 and may have its bandwidth set based on the highest actual signal bandwidth. This variable filter may be a first order RC filter, a second order Butterworth filter, etc.

Figure 10:
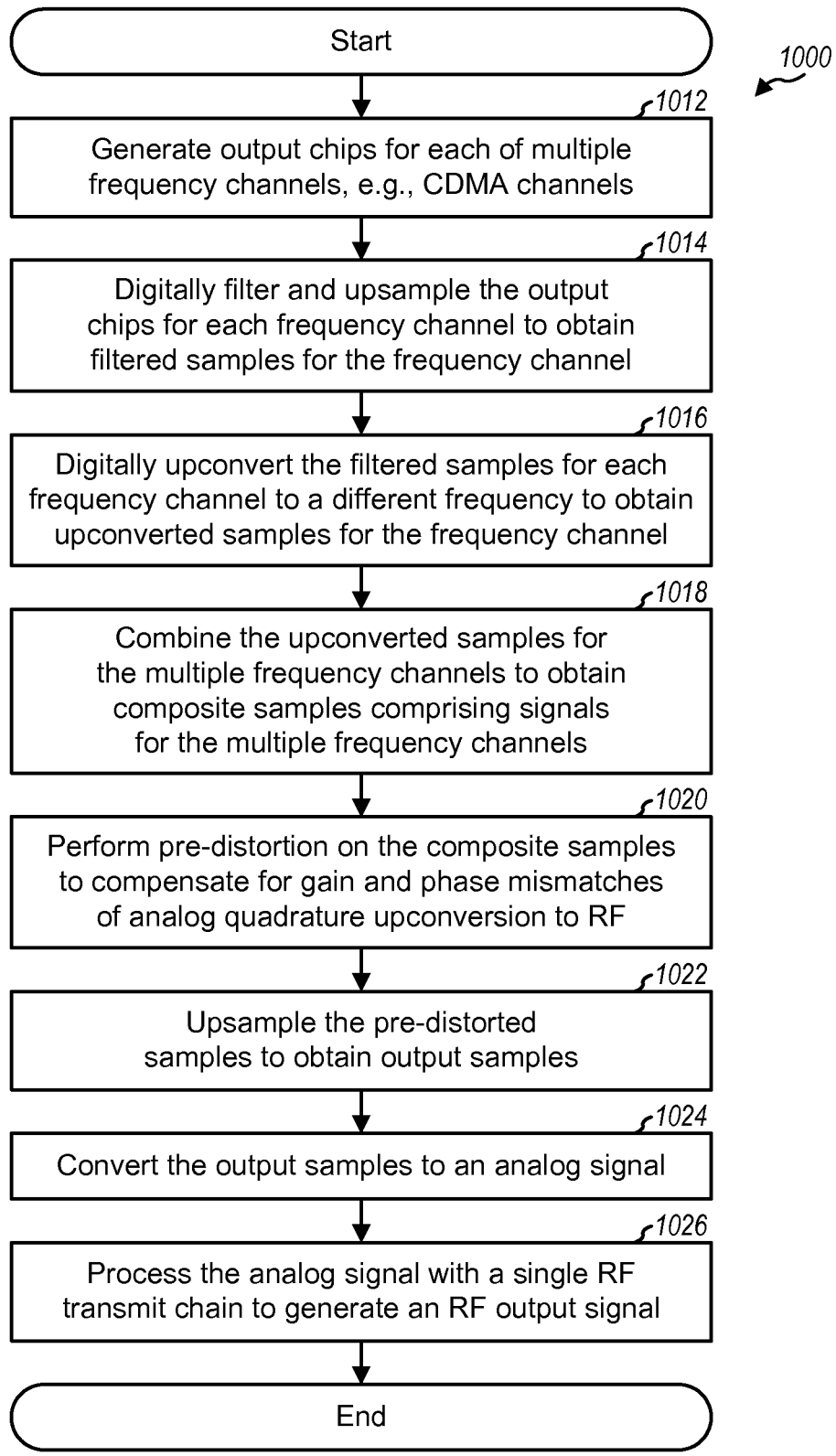
FIG. 10 shows a process for transmission on multiple frequency channels.

FIG. 10 shows a design of a process 1000 for transmission on multiple frequency channels. A frequency channel may be a CDMA channel, a GSM channel, an RF channel, a carrier, etc. Output chips may be generated for each of multiple frequency channels in accordance with a particular system such as HRPD (block 1012). For block 1012, the processing for each frequency channel may include encoding, interleaving, symbol mapping, spreading, etc. The output chips for each frequency channel may be scaled with a gain selected based on the transmit power for that frequency channel. The output chips for each frequency channel may be digitally filtered and upsampled to obtain filtered samples for that frequency channel (block 1014).

The filtered samples for each frequency channel may be digitally upconverted to a different frequency to obtain upconverted samples for that frequency channel (block 1016). The filtered samples for one frequency channel may be digitally upconverted by 0 Hz and centered at DC. The digital upconversion may be performed based on CORDIC computation. In one design, multiple iterations of CORDIC computation may be performed for each filtered sample in multiple pipeline stages (e.g., one stage for each iteration) to rotate the filtered sample by a phase determined by the channel frequency.

The upconverted samples for the multiple frequency channels may be combined to obtain composite samples comprising signals for the multiple frequency channels (block 1018). Pre-distortion may be performed on the composite samples to compensate for gain and phase mismatches of the subsequent analog quadrature upconversion to RF (block 1020). The pre-distorted samples may be upsampled from a first sample rate to a second sample rate to obtain output samples (block 1022). The second sample rate may be selectable, e.g., based on the number of frequency channels being sent. The output samples may be converted to an analog signal with a DAC (block 1024). The analog signal may be processed (e.g., filtered, quadrature upconverted, and amplified) with a single RF transmit chain to generate an RF output signal (block 1026).

In one design of block 1012, which may be applicable for HRPD, at least one long code (e.g., $PN_{T1}$ to $PN_{TN}$) may be generated. A first set of physical layer channels (e.g., the data, pilot, RRI, and auxiliary pilot channels) for the multiple frequency channels may be spread based on a designated long code (e.g., $PN_{T1}$) among the at least one long code. A second set of physical layer channels (e.g., the DRC, ACK and DSC channels) for the multiple frequency channels may be spread based on the at least one long code. For no feedback multiplexing mode, the second set of physical layer channels for each frequency channel may be spread based on the designated long code. For basic feedback multiplexing mode, the second set of physical layer channels for each frequency channel may be spread based on a different long code. For enhanced feedback multiplexing mode, the second set of physical layer channels for at least two subsets of the multiple frequency channels may be spread based on at least two different long codes among the at least one long code. In one design, e.g., as shown in FIG. 7, the first set of physical layer channels for each frequency channel may be spread based on the designated long code. The second set of physical layer channels for each frequency channel may be spread based on a long code (e.g., $PN_{ROC}$) selected for the second set for the frequency channel. For each frequency channel, the spread chips for the first set of physical layer channels for that frequency channel and the spread chips for the second set of physical layer channels mapped to that frequency channel may be combined to obtain the output chips for the frequency channel.

Figure 11:
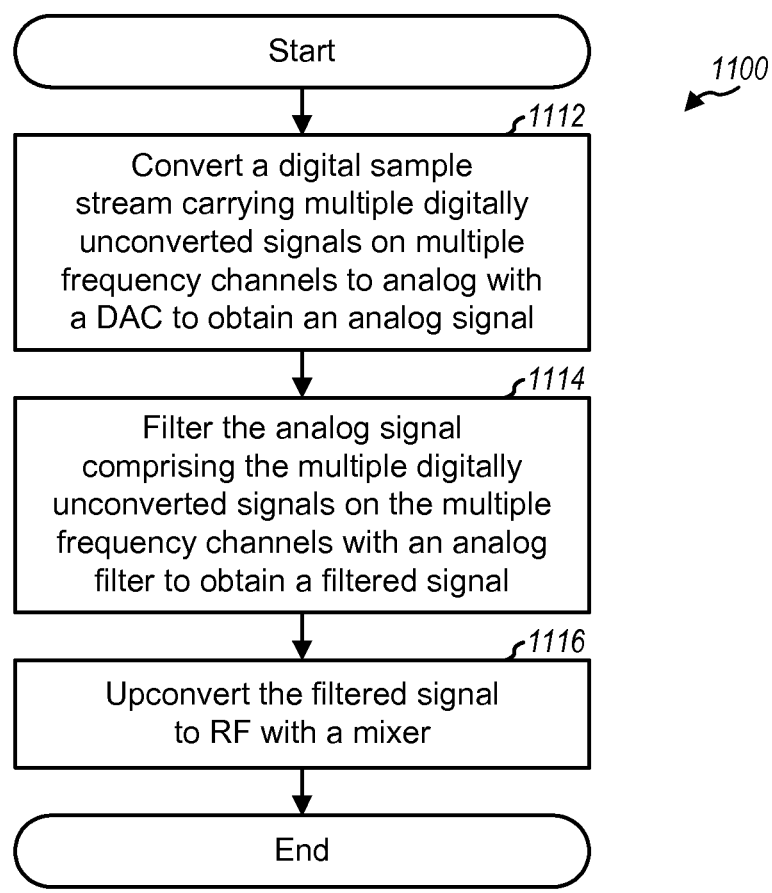
FIG. 11 shows a process performed by an RF transmit chain.

FIG. 11 shows a design of a process 1100 for supporting multiple frequency channels with a single RF transmit chain. A digital sample stream carrying multiple digitally upconverted signals on multiple frequency channels may be converted to analog with a DAC to obtain an analog signal (block 1112). One of the digitally upconverted signals may be centered at DC, or upconverted to 0 Hz. The DAC may be wideband and may have sufficient dynamic range to handle all of the digitally upconverted signals on the multiple frequency channels. The digitally upconverted signals may be sent at different transmit power levels. The DAC may be operated at a clock rate determined based on the highest possible/supported frequency for the multiple digitally upconverted signals. The DAC may also be operated at a variable clock rate determined based on the highest frequency of the multiple digitally upconverted signals being sent.

The analog signal comprising the multiple digitally upconverted signals on the multiple frequency channels may be filtered with an analog filter to obtain a filtered signal (block 1114). The analog filter may have a fixed bandwidth determined based on the highest possible frequency for the multiple digitally upconverted signals. The analog filter may also have a variable bandwidth determined based on the highest frequency of the multiple digitally upconverted signals being sent. The filtered signal may be upconverted to RF with a mixer (block 1116). The mixer may be wideband and designed to cover the multiple frequency channels. The multiple digitally upconverted signals on the multiple frequency channels may correspond to multiple CDMA signals on multiple CDMA channels in an HRPD system or other signals for other communication systems.

The multiple digitally upconverted signals on the multiple frequency channels may differ from multiple subcarriers in an OFDM signal in the following manner. First, the frequencies of the multiple frequency channels may be selected independently (subject to a minimum spacing criterion) whereas the subcarriers in OFDM are constrained to specific frequencies/locations in order to maintain orthogonality. Second, the frequency channels are typically filtered or band-limited prior to combining whereas the subcarriers in OFDM are combined and then filtered. Third, a cyclic prefix is appended to each OFDM symbol by the transmitter and removed by the receiver. Cyclic prefix is not used for the multiple digitally upconverted signals. Fourth, each frequency channel may carry data and control channel whereas data is typically sent across many subcarriers in OFDM. Fifth, each frequency channel may be transmitted and received independently of the other frequency channels whereas all subcarriers are typically sent and received for OFDM.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus comprising:
    at least one processor configured to generate output chips for each of multiple frequency channels, to scale the output chips for a given frequency channel with a gain selected based on a transmit power for the given frequency channel, to digitally upconvert the output chips for each frequency channel to a different frequency and obtain upconverted samples for the frequency channel, and to combine the upconverted samples for the multiple frequency channels to obtain composite samples comprising signals for the multiple frequency channels; and
    a memory coupled to the at least one processor;
    wherein digital upconversion of the output chips for each frequency channel comprises digitally filtering and upsampling output chips for each frequency channel using a digital local oscillator signal to obtain filtered samples having a sample rate based on a number of signals simultaneously transmittable, and digitally upconverting the filtered samples for each frequency to obtain the upconverted samples for the frequency channel;
    and further wherein the at least one processor generates at least one long code, performs spreading of multiple sets of physical layer channels for each of the multiple frequency channels based on the at least one long code, and for each frequency channel, combines spread chips for the multiple sets of physical layer channels to obtain output chips for each frequency channel.

2. The apparatus of claim 1, wherein the at least one processor generates the output chips for each frequency channel based on a gain determined by transmit power for the frequency channel.

3. The apparatus of claim 1, wherein the at least one processor digitally upconverts the filtered samples for each frequency channel based on Coordinate Rotational Digital Computer (CORDIC) computation.

4. The apparatus of claim 3, wherein the at least one processor performs multiple iterations of CORDIC computation for each filtered sample in multiple pipeline stages to rotate the filtered sample by a particular phase.

5. The apparatus of claim 1, wherein the at least one processor performs pre-distortion on the composite samples to compensate for gain and phase mismatches of analog quadrature upconversion to radio frequency (RF).

6. The apparatus of claim 1, wherein the at least one processor upsamples the composite samples from a first sample rate to a second sample rate that is selectable.

7. The apparatus of claim 1, wherein the at least one processor performs spreading for a first set of physical layer channels for the multiple frequency channels based on a designated long code among the at least one long code, and performs spreading for a second set of physical layer channels for the multiple frequency channels based on the at least one long code.

8. The apparatus of claim 7, wherein the at least one processor performs spreading for the second set of physical layer channels for each of the multiple frequency channels based on the designated long code.

9. The apparatus of claim 7, wherein the at least one processor performs spreading for the second set of physical layer channels for each of the multiple frequency channels based on a different long code.

10. The apparatus of claim 7, wherein the at least one processor performs spreading for the second set of physical layer channels for at least two subsets of the multiple frequency channels based on at least two different long codes among the at least one long code.

11. The apparatus of claim 7, wherein the at least one processor performs spreading for the first set of physical layer channels for each frequency channel based on the designated long code, performs spreading for the second set of physical layer channels for each frequency channel based on a long code selected from among the at least one long code and, for each frequency channel, combines spread chips for the first set of physical layer channels for the frequency channel and spread chips for the second set of physical layer channels mapped to the frequency channel to obtain the output chips for the frequency channel.

12. The apparatus of claim 7, wherein the first set of physical layer channels comprises at least one of a data channel, a pilot channel, a reverse rate indicator (RRI) channel, and an auxiliary pilot channel.

13. The apparatus of claim 7, wherein the second set of physical layer channels comprises at least one of a data rate control (DRC) channel, an acknowledgement (ACK) channel, and a data source control (DSC) channel.

14. The apparatus of claim 1, wherein the multiple frequency channels correspond to multiple Code Division Multiple Access (CDMA) channels in a High Rate Packet Data (HRPD) system.

15. A method comprising:
generating output chips for each of multiple frequency channels;
scaling the output chips for a given frequency channel with a gain selected based on a transmit power for the given frequency channel,
digitally upconverting the output chips for each frequency channel to a different frequency to obtain upconverted samples for the frequency channel; and
combining the upconverted samples for the multiple frequency channels to obtain composite samples comprising signals for the multiple frequency channels;
wherein digital upconversion of the output chips for each frequency channel comprises digitally filtering and upsampling output chips for each frequency channel using a digital local oscillator signal to obtain filtered samples having a sample rate based on a number of signals simultaneously transmittable, and digitally upconverting the filtered samples for each frequency to obtain the upconverted samples for the frequency channel;
and further wherein the generating output chips comprises generating at least one long code, performing spreading of multiple sets of physical layer channels for each of the multiple frequency channels based on the at least one long code, and combining spread chips for the multiple sets of physical layer channels for each frequency channel to obtain output chips for each frequency channel.

16. The method of claim 15, further comprising:
performing pre-distortion on the composite samples to compensate for gain and phase mismatches of analog quadrature upconversion to radio frequency (RF).

17. The method of claim 15, further comprising:
upsampling the composite samples from a first sample rate to a second sample rate that is selectable.

18. The method of claim 15, wherein the generating the output chips comprises:
performing spreading for a first set of physical layer channels for the multiple frequency channels based on a designated long code among the at least one long code, and
performing spreading for a second set of physical layer channels for the multiple frequency channels based on the at least one long code.

19. An apparatus comprising:
means for generating output chips for each of multiple frequency channels;
means for scaling the output chips for a given frequency channel with a gain selected based on a transmit power for the given frequency channel,
means for digitally upconverting the output chips for each frequency channel to a different frequency and obtain upconverted samples for the frequency channel; and
means for combining the upconverted samples for the multiple frequency channels to obtain composite samples comprising signals for the multiple frequency channels;
wherein the means for digitally upconverting the output chips for each frequency channel comprises means for digitally filtering and upsampling output chips for each frequency channel using a digital local oscillator signal to obtain filtered samples having a sample rate based on a number of signals simultaneously transmittable, and digitally upconverting the filtered samples for each frequency to obtain the upconverted samples for the frequency channel;
and further wherein the means for generating output chips comprises means for generating at least one long code, means for performing spreading of multiple sets of physical layer channels for each of the multiple frequency channels based on the at least one long code, and means for combining, for each frequency channel, spread chips for the multiple sets of physical layer channels to obtain the output chips for each frequency channel.

20. The apparatus of claim 19, further comprising:
means for performing pre-distortion on the composite samples to compensate for gain and phase mismatches of analog quadrature upconversion to radio frequency (RF).

21. The apparatus of claim 19, further comprising:
means for upsampling the composite samples from a first sample rate to a second sample rate that is selectable.

22. The apparatus of claim 19, wherein the means for generating the output chips comprises:
    means for performing spreading for a first set of physical layer channels for the multiple frequency channels based on a designated long code among the at least one long code, and
    means for performing spreading for a second set of physical layer channels for the multiple frequency channels based on the at least one long code.

23. A computer program product, comprising:
    a non-transitory computer-readable medium comprising:
        code for causing a computer to generate output chips for each of multiple frequency channels;
        code for scaling the output chips for a given frequency channel with a gain selected based on a transmit power for the given frequency channel,
        code for causing the computer to digitally upconvert the output chips for each frequency channel to a different frequency and obtain upconverted samples for the frequency channel; and
        code for causing the computer to combine the upconverted samples for the multiple frequency channels to obtain composite samples comprising signals for the multiple frequency channels;
    wherein the code for causing the computer to digitally upconvert the output chips for each frequency channel comprises code for digitally filtering and upsampling output chips for each frequency channel using a digital local oscillator signal to obtain filtered samples having a sample rate based on a number of signals simultaneously transmittable, and digitally upconverting the filtered samples for each frequency to obtain the upconverted samples for the frequency channel;
    and wherein the code for causing the computer to generate output chips for each of multiple frequency channels comprises code for generating at least one long code, code for performing spreading of multiple sets of physical layer channels for each of the multiple frequency channels based on the at least one long code, and code for combining, for each frequency channel, spread chips for the multiple sets of physical layer channels to obtain the output chips for each frequency channel.

* * * * *